Figure 1:
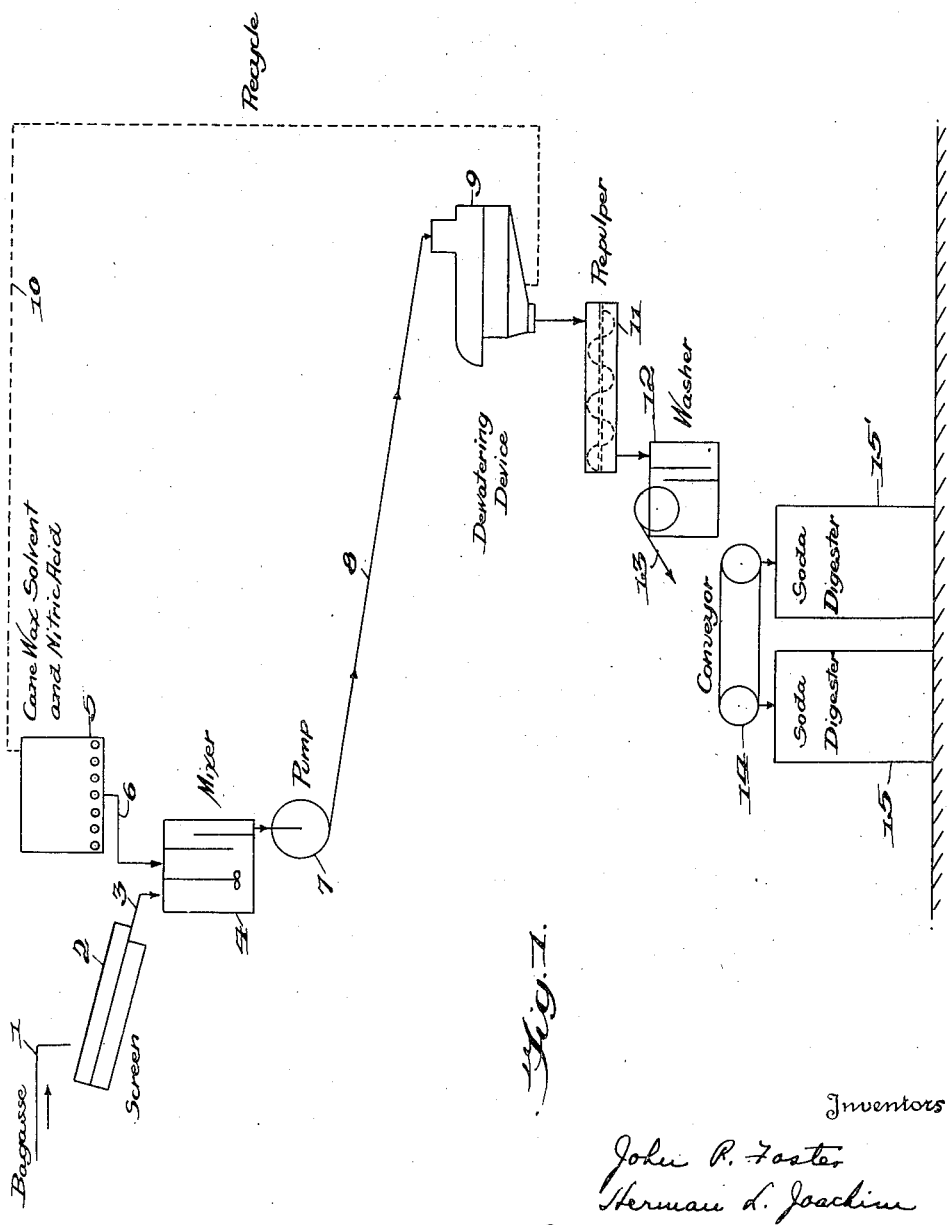

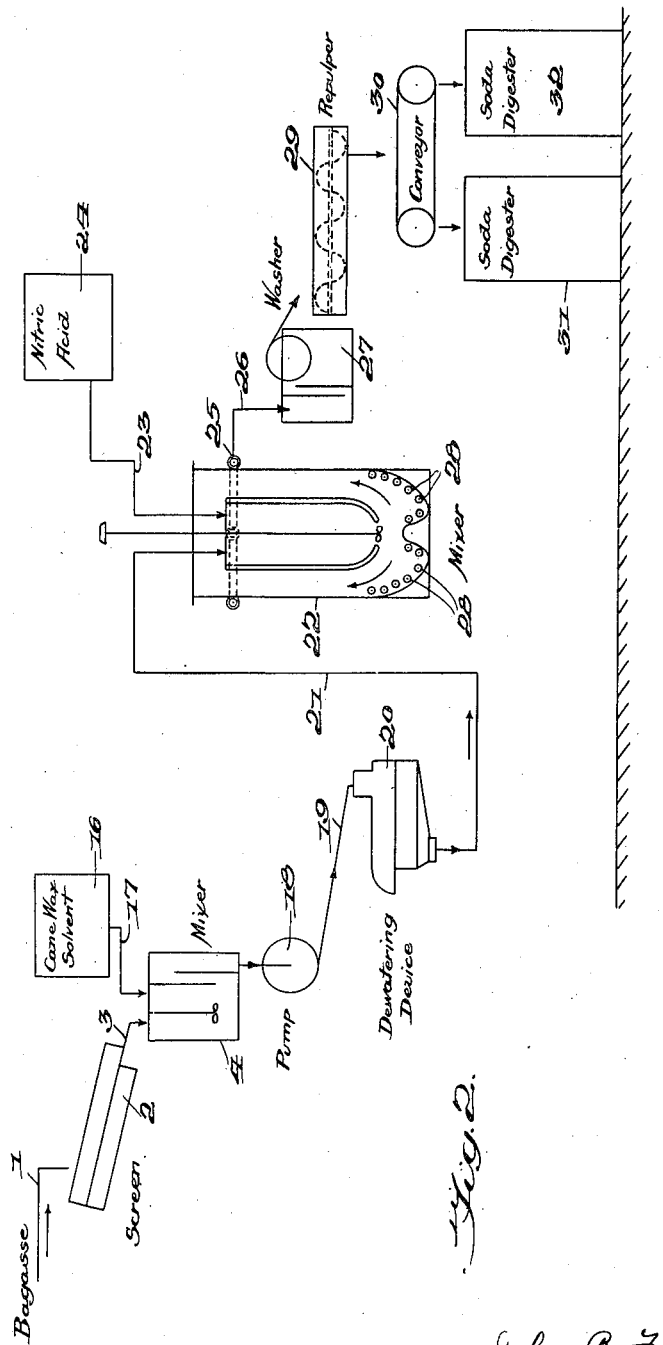

Patented Nov. 28, 1939

2,181,785

UNITED STATES PATENT OFFICE 2,181,785

PROCESS OF LIBERATING CELLULOSE FROM BAGASSE

John P. Foster, Paia, Hawaii, and Herman L. Joachim, San Francisco, Calif., assignors to Maui Agricultural Company, Ltd., Paia, Hawaii, a corporation of Hawaii Application September 16, 1937, Serial No. 164,212

16 Claims. (Cl. 92—9)

This invention relates to processes of liberating cellulose from bagasse and it comprises processes wherein bagasse, prior to the fiber-liberation treatment, is subjected to the action of solutions which will remove from the bagasse the cane wax associated therewith. It also comprises processes wherein the bagasse is subjected to the action of a mixture of dilute nitric acid and a solution capable of removing cane wax from the bagasse, and it further comprises processes wherein the preliminary treatment stated is conducted in a continuous manner. It additionally comprises as a new material a solution of nitric acid containing substances which will function to remove cane wax from the bagasse.

Sugar cane is one of the most important cellulose bearing crops because it can be rapidly grown. In Hawaii, for instance, the sugar cane crop is harvested at an age of about eighteen months, and in Louisiana at an age of about eight months. Great quantities of bagasse are available from every sugar cane crop, and the time from planting to harvesting the cane is many times less than most other commercial sources of cellulose with the exception of cotton. Because of this desirable crop situation many efforts have been directed towards methods of liberating pure cellulose from bagasse.

Although bagasse has a very high content of alpha cellulose and is thus one of the most attractive sources of cellulose, it has been common experience in the past that the fiber-liberating methods used have not been satisfactory. Pure cellulose fibers can, of course, be obtained from bagasse but most of the methods heretofore known have been so drastic that much of the available cellulose has been lost, and the time required to treat the bagasse has been so long that such methods have not been economically practical.

Although the methods commonly employed in liberating fibers from wood, straw and grass may possibly be used with some degree of success in liberating cellulose fibers from sugar cane which has been permitted to dry out, such methods are ineffective to liberate cellulose fibers from bagasse on a commercial scale because, as produced by modern milling methods, bagasse is profoundly modified with respect to its reaction to fiber liberating agents from the sugar cane fiber as it exists in situ in the cane stalk.

The outside protective tissue of all plants is cellular rather than fibrous and it is covered or impregnated with a substance of marked water-resisting characteristics. This water-resisting substance appears on many of the grasses as a whitish wax-like deposit upon the cuticle. On the cuticle of the sugar cane, it is frequently so plentiful that considerable quantities may be scraped off with a pen knife or with the finger nail. In recognition of its fatty nature and its locale on the plant, it is known as "cuticular adipo-cellulose". Sugar cane growers and cane sugar manufacturers commonly call it "sugar cane wax".

Bagasse is a by-product or residue from the complex modern milling of sugar cane. This milling, of course, is for the extraction of sugar and not for the preparation of fiber. The cane undergoes from six to fourteen distinct crushing operations and is repeatedly sprayed with large quantities of hot water. In its passage through the mills, the cane becomes fully "wetted-out" and so thoroughly "scrambled" that the resulting material, designated bagasse, is a homogeneous mass. In this mass, cuticle, epidermis, cellular structure, parenchyma and sclerenchyma are completely commingled. Moreover, the repeated screening of the cane juice, not only by the returning of the juice fractions over the blanket of crushed cane passing through the mills, but also by the screening of the juice after it has been drawn off from the mills, incorporates into the bagasse extraneous matter as well as organic components of the juice which are coagulated by the hot water which is used. Bagasse, therefore, is not a natural but a highly artificial product from which the pulp maker has no opportunity of selection other than particle size.

The wood pulp manufacturer barks the wood billets, getting rid of the cuticular tissue, and he also removes the exteriorly located knots, etc. Grass, straw and the like come to the manufacturer substantially dry, in which state the preliminary operations, such as scrutching, hackling, etc., remove the dried scales of cuticular adipo. Straw as a by-product of a cereal goes through threshing and other operations which remove the cuticular adipo material.

In sharp contrast to ordinary fiber bearing material, sugar cane is rushed to the mills with as little loss of time as possible, in order to avoid loss of sugar by deterioration of the juice which begins within a few hours after the cane is cut. The speed of the mass operations in modern cane harvesting precludes any drying of the cuticle or dislodgement of the adhering cane wax coating. Under the ponderous milling operations, the cane wax becomes intimately mixed with the bagasse mass and under repeated pressures of hundreds of tons applied in each crushing operation, the cane wax, whether as a solid, semi-solid or as a strong emulsion, is literally driven into and incorporated with the bagasse particles. There are marked differences, therefore, between the physical structure of bagasse and the physical structure of sugar cane, wood, straw and other similar cellulosic material.

In setting ourselves to devising an economically practical method for recovering cellulose on a commercial scale from bagasse, we have discovered that the principal offender in preventing the liberation of cellulose is the cuticular adipo material. Since the cane wax, which term will be hereafter used instead of cuticular adipo-cellulose, is so intimately associated with the fiber bundles it is now understandable, as a result of our discoveries, why fiber liberating methods hitherto used have not been satisfactory when applied to bagasse. In view of the nature of the cane wax and its behavior towards aqueous liquids, it is now apparent that the cane wax resists wetting of the fiber liberating solutions and that these solutions must be of great strength in order to break down the cane wax and permit the solution to act upon the cellulose fiber bundles. Not only does the cane wax resist penetration of the fiber bundles by the aqueous fiber liberating liquids but the cellulosic membranes of the fiber wall which are only semi-permeable also resist the penetration of digesting reagents.

In prior practices of liberating cellulose fibers from bagasse, much of the available cellulose has been lost through chemical degradation of the cellulosic membrane of the fiber wall and it has not been possible to obtain a uniform product free from residues of cane wax. Even though strong caustic soda solutions at high temperatures and pressures have been used with a resulting sacrifice of yield, the presence of cane wax has prevented the obtaining of a satisfactory product.

We have discovered that by treating bagasse with solutions capable of removing the cane wax prior to the application of fiber liberating reagents, a uniformly satisfactory product is obtainable in sufficient quantities as to render the recovery of cellulose from bagasse on a commercial scale economically feasible. We have further discovered that the cane wax can be removed by fiber-liberating agents containing solvents or dispersing agents for the wax. In broad aspects, our invention comprises preliminarily treating the bagasse with liquids which will either emulsify, disperse, or dissolve the cane wax in the bagasse. Thereafter the bagasse, freed of its cane wax, may be subjected to any fiber-liberating process, although fiber-liberating methods which have been found particularly advantageous are hereinafter described and claimed.

As agents for removing the cane wax, we can use organic solvents for the wax, such as toluol, benzol, carbontetrachloride, acetone and alcohol-ether mixtures. When using these solvents, we simply subject the bagasse to extraction, advantageously at temperatures just below the boiling point of the solvent, and after the cane wax has been extracted, we withdraw the cane wax solution from the bagasse, dry the bagasse, and then subject it to a fiber liberation process.

The organic solvent method of removing the cane wax, while it can be used, is objectionable because it involves solvent recovery and is somewhat expensive. Consequently, we prefer to use as agents for removing the cane wax, aqueous solutions which either function to actually dissolve the cane wax or disperse it, possibly as an emulsion. We have discovered that aqueous solutions of wetting agents are especially suitable for this modification of our process and in preliminarily treating the bagasse with wetting agents we subject the bagasse in a mixing vessel to an aqueous solution containing about 4 pounds of the wetting agent for each 4 or 5 tons of dry bagasse. The solution may have a concentration of about 0.1 to 1 percent of wetting agent. This aqueous treatment of the bagasse prior to fiber-liberation removes all of the cane wax associated with the bagasse and the aqueous solution is simply drained from the bagasse and fiber-liberating chemicals are then admixed with the treated bagasse.

As wetting agents, we can use any of the well known organic compounds advocated for obtaining better wetting action between solids and fluids. Most of these agents are sulfonated alcohols, amines, sulfonated alkyl derivatives of naphthalene, sulfonated rosin distillates, etc. They are obtainable under trade names, such as Nekal, Gardinol and Neomerpin. Nekal "BX", which is di-isobutyl naphthalene sodium sulfonate, has been found most beneficial.

These cane wax solvents or dispersing agents remove cane wax from the bagasse fiber bundles. They have no chemical action on the cellulose fibers themselves. Moreover, they probably almost entirely eliminate the semi-permeability of the cellulosic membranes of the fiber wall and so materially change their character that acid solutions and the alkaline digestion liquors penetrate them without first degrading the cellulose. The yield of cellulose is, therefore, markedly increased because the cellulose of the membrane, instead of being lost is recovered and the final product is considerably more uniform and pure since it is free of all cane wax or cane wax decomposition products which might be formed as a result of reaction between cane wax and the digestion liquors.

In advantageous embodiments of our invention, we preliminarily subject the bagasse to the action of nitric acid and a cane wax solvent or dispersing agent. Nitric acid has a favorable influence on the removal of pecto-cellulose present in bagasse because it hydrolizes the sugars and thus prevents the formation of difficultly removable gelatinous materials in the alkaline digestion treatment. It also is a resolvent of ligno-cellulose which is likewise present in bagasse.

Our cane wax solvents have been found to not only increase the rate of penetration of the digestion liquors but also to greatly accelerate the action of the nitric acid. In fact the action of our treating agents is so effective, both in the removal of cane wax and in accelerating the penetration of the nitric acid that the entire treatment of the bagasse prior to alkaline digestion may be carried out in a continuous manner. Whereas other processes which include treatment of the bagasse prior to fiber-liberation by alkaline digestion require at least an hour and usually a considerably longer time for the preliminary treating reagent to work, we find that our wetting agents or cane wax solvents are so rapid in their action that the entire treatment prior to alkaline digestion can be accomplished in as short a time as four minutes. It is, therefore, possible by our invention to treat the bagasse prior to alkaline digestion by continuously admixing the cane wax solvent and nitric acid with it as it is being conveyed to the alkaline digestors.

The alkaline digestion of the bagasse is carried out in the usual way to resolve the pecto-cellulose, but it need not be as drastic as that required in hitherto known processes because the cane wax solvent apparently contributes to a more rapid and complete resolution of the pecto-cellulose at reduced time, temperature and pressure.

The treatment with cane wax solvents and with acid can be conducted in successive stages, that is to say, the bagasse can first be subjected to the solvent and then to nitric acid, or these steps can be combined into a single treatment wherein the bagasse is treated with a mixture of nitric acid and cane wax solvent.

The nitric acid treatment is advantageously conducted at a moderately elevated temperature, about 160° F., but this temperature may be increased or decreased by 20° or 30°. The cane wax solvent can be applied at ordinary room temperature but, when it is combined with the nitric acid, the solution is heated to the moderately elevated temperature indicated.

In more specific aspects, our invention, therefore, comprises as a step prior to alkaline fiber liberation, the treatment of bagasse with a cane wax solvent and with dilute nitric acid. This treatment may be conducted batch-wise but, in view of the savings in time and expense which can be effected, it is exceedingly more preferable to conduct it in a continuous manner, the pulp of bagasse flowing continuously from the point of introduction, through the preliminary treatment stages, to alkaline digestion tanks.

In the following description, we use the expression cane wax solvent to broadly cover those materials which we have described as useful in the removal of cane wax. It is not certain whether treating the bagasse with an aqueous solution of a wetting agent removes the cane wax as a true solution or as an emulsion. Since, however, the can wax appears to dissolve in the aqueous solution of wetting agents we are, as a matter of convenience, referring to the solution of the wetting agent or the material functioning for the purpose of removing the cane wax as a "cane wax solvent". Quite probably the cane wax goes into colloidal solution in the presence of the wetting agent so use of the expression cane wax solvent is appropriate.

In the drawings illustrating our process in flow-sheet form,

Figure 1 shows a flow-sheet setup of apparatus wherein the bagasse is treated prior to alkaline digestion with a solution of nitric acid including the cane wax solvent, and Figure 2 represents an apparatus setup wherein the bagasse is treated successively, first with cane wax solvent, and then with nitric acid.

Referring more particularly to Figure 1, the moist shredded bagasse is conducted by line 1 to a screening device 2 wherein particles of pith and very short fibers are screened out. The bagasse leaves the screening device by line 3 and feeds into a mixing tank 4. Nitric acid having a concentration of about 2.5% to 3%, and at a temperature which may vary from about 150° F. to 190° F. but is preferably about 160° F. to 180° F., flows out of a storage tank 5 by way of line 6. The acid solution includes a cane wax solvent such as an aqueous solution of a wetting agent and the quantity of solvent present is such that there are approximately four pounds of wetting agent for each four or five tons of dry bagasse. An excess of wetting agent does no harm but is wasteful. Ordinarily the amount of wetting agent will be about one part by weight to twenty-six hundred parts by weight of the dilute nitric acid solution. The nitric acid solution is used in the ratio of about twenty-eight hundred pounds of solution per ton of bagasse.

The acid solution and the bagasse are initially mixed in tank 4, and are further mixed in slush pump 7 having an outlet for the mixture connected to line 8. Line 8 is a pipe of suitable length which conducts the mixture of bagasse, acid and cane wax solvent to a dewatering device 9. The flow of bagasse mixture through tank 4 and pipe 8 is continuous and should be such that about 3 to 5 minutes elapse from the time the bagasse is fed into tank 4 until the mixture reaches the dewatering device 9. This is adequate time for the desirable reaction to occur in the bagasse fibers.

In dewatering device 9, the pulp mixture which enters at a pulp concentration of about 3½% to 4% is concentrated to about 15% to 16%. Aqueous fluids flowing from the dewatering device can, if desired, be recycled to the acid storage by way of line 10.

The thickened pulp mass flows to a repulper 11 where the pulp is thoroughly homogenized and then goes to a vacuum washer 12. In the vacuum washer the pulp is washed with water and leaves the washer by way of 13 where it is conducted to a traveling conveyor 14. The pulp now has a concentration of about 12% of fiber and the traveling conveyor can be moved to feed the pulp to soda digestors 15 and 15'. This traveling conveyor is simply one convenient form of charging device to convey the pulp from the washer to one or more soda digestors.

In the digestors the treated pulp is digested with caustic soda solution at about 35 pounds gauge pressure or at about 280° F., the caustic soda having a concentration of about 5%. Herein the alpha cellulose is liberated, withdrawn from the digestor, washed and bleached in the usual way.

In Figure 2, we show an apparatus setup for practicing our invention in a two-step treatment process prior to alkaline digestion. Bagasse is charged to screen 2 through line 1, and leaves the screening device by way of line 3 for discharge into the mixing tank 4. A solution of cane wax solvent is maintained in tank 16 from which it flows through line 17 to tank 4 where it is mixed with the bagasse.

The mixture of solvent and bagasse flows continuously to a slush pump 18 where it is further admixed and it is then conducted by line 19 to a dewatering device 20. From the dewatering device the thickened pulp passes by way of line 21 to a tank 22 which is supplied through line 23 with a solution of nitric acid from tank 24.

The pulp and acid which are supplied to tank 24 continuously are thoroughly mixed therein and the resulting mixture discharges from the tank in a continuous stream through pipe 25, to line 26 and thence to a vacuum washer 27. Any of the usual and well known means may be employed for controlling the rate of supply of nitric acid to tank 24 so as to regulate the consistency of the mixture passing from the tank. Moreover, the tank is preferably provided with steam coils 28 for heating the mixture to the desired temperature.

The pulp from the washer 27 is conducted to a repulper 29 where it is thoroughly homogenized and is brought to the desired concentration before being delivered by the conveyor 30 to the digestors 31 and 32.

In this modification of our process the solution of cane wax solvent advantageously has a concentration of about 0.2% to 2% of wetting agent and is admixed with the pulp in such concentration that there are about four pounds of wetting agent for each four or five tons of bagasse. The mixture of nitric acid and treated bagasse in tank 22 is heated to a temperature of about 160° to 190° F. In all other respects, the process steps are substantially identical with that shown in Figure 1.

In both Figures 1 and 2, there is a continuous flow of pulp from the bagasse source to the soda digestors. The alkaline digesting operation, however, is conducted in batches and the conveyors 14 and 30 are, as stated, used to convey the pulp to each digestor which is to be charged.

The continuous method which we have described is particularly advantageous since it is rapid and effective in treating the bagasse. However, it will be understood by those skilled in the art that we can use batch treatment as well. In that case, we charge a suitable vessel with the bagasse, admix it with a heated solution of nitric acid including the cane wax solvent, draw off the solution, wash the pulp if necessary, and then run in the alkaline digesting liquid. Or we can first treat with cane wax solvent, then with hot nitric acid, and finally with the alkaline digestion liquid.

As stated, there are many compounds which we can use in our process as cane wax solvents when dissolved in water. All of them should, however, be soluble or miscible with nitric acid solution, if they are to be used therein. They need not be miscible with nitric acid, if they are used in a separate treating step, but they must be soluble in water.

By the processes of the present invention the recovery of alpha cellulose from bagasse on a commercial scale has been made economically feasible. This is primarily due to two factors, namely, the reduction in time required for treating the bagasse and increased yield of cellulose.

The great saving in time which is made possible by our process results in a large measure from the use of cane wax solvents. The action of this solvent is so very rapid that it can be continuously admixed with a flowing stream of bagasse and the resulting mixture passed rapidly and continuously to the alkaline digestion treatment. Not only does this result in shortening the duration of the treatment prior to alkaline digestion by hours but the solvent is so effective in its action that the caustic soda fiber liberating chemicals act with greater rapidity. Thus the actual time between the introduction of bagasse into the process and the withdrawal of liberated cellulose is very materially decreased.

By being able to conduct the treatment of the bagasse prior to alkaline digestion in a continuous manner instead of in batches, those skilled in the art will readily appreciate that marked economies are effected in the plant equipment necessary for practicing the process.

The increased yield in cellulose made possible by our process is primarily due to the fact that the cane wax solvent, instead of dissolving through chemical degradation the cellulosic membrane composing the fiber wall, renders the membrane permeable and this enables a free passage of the fiber liberating chemicals to the fiber. The cellulose of the membrane is, therefore, not lost but is recovered and this results in increasing the cellulose yield by as much as 15%, an increase hitherto considered impossible of accomplishment. The yield of cellulose is also increased and a more uniform and pure product is obtained by our process because of the superior resolvent action upon all three of the compound celluloses present in bagasse, especially upon the epidermal adipocellulose.

Further economies are made possible by our process because the preliminary treatment is so efficient that weaker soda solutions and lower digestion temperatures may be used than have been previously regarded necessary and the recovered cellulose requires less bleaching.

This application is a continuation in part of our copending application Serial No. 115,244, filed December 10, 1936.

What we claim is:

1. In the process of liberating cellulose from sugar cane bagasse by digestion of the bagasse with fiber liberating chemicals, the improvement which comprises subjecting the bagasse, prior to the digestion treatment, to the action of a cane wax solvent to remove cane wax from the fiber bundles of the bagasse.

2. In the process of liberating cellulose from sugar cane bagasse by digestion of the bagasse with fiber liberating chemicals, the improvement which comprises subjecting the bagasse, prior to the digestion treatment, to the action of a dilute nitric acid solution including a cane wax solvent, said solvent serving to remove cane wax from the bagasse fiber bundles.

3. In the process of liberating cellulose from sugar cane bagasse by digestion of the bagasse with fiber liberating chemicals, the improvement which comprises subjecting the bagasse, prior to the digestion treatment, to the action of a cane wax solvent to remove cane wax from the bagasse fiber bundles, and then to the action of a dilute nitric acid solution.

4. In the process of liberating cellulose from sugar cane bagasse by digestion of the bagasse with fiber liberating chemicals, the step which comprises continuously admixing a cane wax solvent with a flowing stream of the bagasse prior to the digestion treatment to remove cane wax from the bagasse fiber bundles.

5. In the process of liberating cellulose from sugar cane bagasse by digestion of the bagasse with fiber liberating chemicals, the steps which comprise admixing the bagasse, prior to the digestion treatment, with an aqueous solution of an organic wetting agent serving as a cane wax solvent to remove cane wax from the bagasse, continuously admixing dilute nitric acid solution with a flowing stream of said mixture, and continuously flowing the resulting mixture to the fiber liberating process.

6. In the process of liberating cellulose from sugar cane bagasse by digestion of the bagasse with fiber liberating chemicals, the steps which comprise continuously admixing with a flowing stream of the bagasse, prior to the digestion treatment, an aqueous solution of a cane wax solvent to remove cane wax from the bagasse fiber bundles, continuously admixing dilute nitric acid solution with a flowing stream of said mixture, and continuously flowing the resulting mixture to the fiber liberating process.

7. In the process of liberating cellulose from sugar cane bagasse by digestion of the bagasse with fiber liberating chemicals, the steps which comprise continuously admixing with a flowing stream of the bagasse, prior to the digestion thereof, an aqueous nitric acid solution containing an organic wetting agent serving as a cane wax solvent to remove cane wax from the bagasse fiber bundles, and continuously flowing the resulting mixture to the fiber liberating process.

8. The process as in claim 2, wherein the nitric acid solution is at a temperature of about 160° F. to 180° F.

9. The process as in claim 3, wherein the nitric acid solution is at a temperature of about 160° F. to 180° F.

10. The process as in claim 5, wherein the nitric acid solution is at a temperature of about 160° F. to 180° F.

11. The process as in claim 6, wherein the nitric acid solution is at a temperature of about 160° F. to 180° F.

12. The process of liberating cellulose from sugar cane bagasse which comprises, treating the bagasse with a cane wax solvent to remove cane wax from the bagasse fiber bundles, and then subjecting the treated bagasse to the action of an alkaline fiber liberating reagent to liberate the cellulose.

13. The process of liberating cellulose from sugar cane bagasse which comprises, treating the bagasse with a dilute nitric acid solution containing an organic wetting agent serving as a cane wax solvent to remove cane wax from the bagasse fiber bundles, and then subjecting the treated bagasse to the action of an alkaline fiber liberating reagent to liberate the cellulose.

14. The process of liberating cellulose from sugar cane bagasse which comprises, treating the bagasse with a cane wax solvent to remove the cane wax from the fiber bundles of bagasse, subjecting the treated bagasse to the action of dilute nitric acid, and then treating the bagasse with an alkaline fiber liberating reagent to liberate the cellulose.

15. The process as in claim 13, wherein the nitric acid has a temperature of about 160° F. to 180° F.

16. The process as in claim 14, wherein the nitric acid has a temperature of about 160° F. to 180° F.

JOHN P. FOSTER.
HERMAN L. JOACHIM.